(12) United States Patent
Hoang

(10) Patent No.: US 6,725,267 B1
(45) Date of Patent: Apr. 20, 2004

(54) PREFETCHED DATA IN A DIGITAL BROADCAST SYSTEM

(75) Inventor: Khoi Hoang, Newark, CA (US)

(73) Assignee: Prediwave Corporation, Fremont, CA (US)

( * ) Notice: Subject to any disclaimer, the term of this patent is extended or adjusted under 35 U.S.C. 154(b) by 0 days.

(21) Appl. No.: 09/709,948

(22) Filed: Nov. 10, 2000

Related U.S. Application Data

(63) Continuation-in-part of application No. 09/584,832, filed on May 31, 2000.

(51) Int. Cl.$^7$ ............................................. G06F 15/16
(52) U.S. Cl. ..................... 709/226; 709/104; 709/217; 709/233
(58) Field of Search ................................ 709/104, 217, 709/226, 233

(56) References Cited

U.S. PATENT DOCUMENTS

| | | | |
|---|---|---|---|
| 4,280,221 A | 7/1981 | Chun et al. ................... 375/17 |
| 4,945,563 A | 7/1990 | Horton et al. | |
| 4,963,995 A | 10/1990 | Lang ........................... 358/335 |
| 5,089,982 A | 2/1992 | Gran et al. .................. 364/726 |
| 5,132,992 A | 7/1992 | Yurt et al. | |
| 5,421,031 A | 5/1995 | De Bey ........................ 725/92 |
| 5,521,630 A * | 5/1996 | Chen et al. | |
| 5,557,316 A | 9/1996 | Hoarty et al. .................. 348/7 |
| 5,604,528 A | 2/1997 | Edwards et al. | |
| 5,612,742 A | 3/1997 | Krause et al. | |
| 5,619,249 A | 4/1997 | Billock et al. | |
| 5,632,681 A | 5/1997 | Bakoglu et al. | |
| 5,654,746 A | 8/1997 | McMullan, Jr. et al. | |
| 5,701,582 A | 12/1997 | De Bey ........................ 455/5.1 |
| 5,724,646 A | 3/1998 | Ganek et al. ................. 455/4.2 |
| 5,745,758 A | 4/1998 | Shaw et al. | |
| 5,751,282 A | 5/1998 | Girard et al. ................ 345/327 |
| 5,751,709 A | 5/1998 | Rathnavelu .................. 370/395 |
| 5,768,539 A | 6/1998 | Metz et al. | |
| 5,781,228 A * | 7/1998 | Sposato | |
| 5,790,423 A | 8/1998 | Lau et al. | |
| 5,805,804 A | 9/1998 | Laursen et al. ........ 395/200.02 |
| 5,815,146 A | 9/1998 | Youden et al. .............. 345/327 |
| 5,850,258 A | 12/1998 | Kang .......................... 348/390 |

(List continued on next page.)

OTHER PUBLICATIONS

PCT International Search Report, International Application No. PCT/US02/19618 filed Jun. 20, 2002, mailed Sep. 19, 2002, 4 pages.

Video on Demand Technologies and Demonstrations, Final Report, Marek Podgorny and Geoffrey C. Fox, Northeast Parallel Architectures Center, Contract No.: F–30602–94–C–0256, Mar. 1997, pp. 1–108.

(List continued on next page.)

Primary Examiner—Le Hien Luu
Assistant Examiner—Stephan Willett

(57) ABSTRACT

A method for sending data to a client to provide data-on-demand services comprises the steps of: receiving a data file, specifying a time interval, parsing the data file into a plurality of data blocks based on the time interval such that each data block is displayable during a time interval, determining a required number of time slots to send the data file, allocating to each time slot at least a first of the plurality of data blocks and optionally one or more additional data blocks, such that starting from any of the time slots, (i) the data file can be displayed by accessing the first of the plurality of data blocks; (ii) at a consecutive time slot, a next data block sequential to a prior displayed data block is available for displaying; and (iii) repeating step (ii) until all of the plurality of data blocks for the data file has been displayed, and sending the plurality of data blocks based on the allocating step.

14 Claims, 5 Drawing Sheets

U.S. PATENT DOCUMENTS

| | | | |
|---|---|---|---|
| 5,856,973 A | 1/1999 | Thompson | 370/389 |
| 5,892,535 A | 4/1999 | Allen et al. | 348/9 |
| 5,909,594 A | 6/1999 | Ross et al. | |
| 5,915,094 A | 6/1999 | Kouloheris et al. | 395/200.49 |
| 5,949,948 A | 9/1999 | Krause et al. | 386/6 |
| 5,961,603 A | 10/1999 | Kunkel et al. | |
| 5,978,649 A | 11/1999 | Khan | |
| 5,995,092 A | 11/1999 | Yuen et al. | |
| 6,005,599 A | 12/1999 | Asai et al. | 348/7 |
| 6,011,798 A | 1/2000 | McAlpine | 370/395 |
| 6,012,080 A | 1/2000 | Ozden et al. | 709/102 |
| 6,018,359 A | 1/2000 | Kermode et al. | 348/7 |
| 6,018,765 A | 1/2000 | Durana et al. | 709/217 |
| 6,028,847 A | 2/2000 | Beanland | 370/252 |
| 6,029,045 A | 2/2000 | Picco et al. | |
| 6,029,046 A | 2/2000 | Khan et al. | |
| 6,049,332 A | 4/2000 | Boetje et al. | |
| 6,049,539 A | 4/2000 | Lee et al. | |
| 6,055,560 A | 4/2000 | Mills et al. | 709/200 |
| 6,055,571 A * | 4/2000 | Fulp et al. | |
| 6,058,122 A | 5/2000 | Hwang et al. | 370/522 |
| 6,075,570 A | 6/2000 | Usui et al. | 348/569 |
| 6,076,062 A * | 6/2000 | Van Steenbrugge | |
| 6,112,023 A | 8/2000 | Dave et al. | |
| 6,118,821 A * | 9/2000 | Matsumoto et al. | |
| 6,119,163 A * | 9/2000 | Monteiro et al. | |
| 6,128,467 A | 10/2000 | Rege | 455/4.2 |
| 6,157,949 A | 12/2000 | Cheng et al. | 709/219 |
| 6,160,546 A | 12/2000 | Thompson et al. | 345/327 |
| 6,169,767 B1 * | 1/2001 | Strolle et al. | |
| 6,198,723 B1 | 3/2001 | Parruck et al. | 370/230 |
| 6,199,076 B1 | 3/2001 | Logan et al. | 707/501 |
| 6,212,681 B1 | 4/2001 | Ikeda | 725/92 |
| 6,215,526 B1 | 4/2001 | Barton et al. | 348/473 |
| 6,219,355 B1 | 4/2001 | Brodigan | 370/486 |
| 6,222,530 B1 | 4/2001 | Sequeira | |
| 6,233,389 B1 | 5/2001 | Barton | 386/46 |
| 6,246,695 B1 | 6/2001 | Seazholtz et al. | 370/468 |
| 6,263,019 B1 * | 7/2001 | Ryan | |
| 6,266,369 B1 | 7/2001 | Wang et al. | |
| 6,282,195 B1 | 8/2001 | Miller et al. | 370/392 |
| 6,349,098 B1 | 2/2002 | Parruck et al. | 370/395 |
| 6,370,688 B1 | 4/2002 | Hejna, Jr. | 725/101 |
| 6,389,075 B2 | 5/2002 | Want et al. | |
| 6,477,579 B1 | 11/2002 | Kunkel et al. | |
| 6,502,139 B1 | 12/2002 | Birk et al. | 709/233 |
| 2001/0014211 A1 * | 8/2001 | Morinaga | |

OTHER PUBLICATIONS

PCT/ISA/220, PCT ISR, International Application No. PCT/US02/12752 Filed Apr. 23, 2002, mailed Feb. 10, 2003.

PCT/ISA/220, PCT ISR, International Application No. PCT/US02/3800 Filed Nov. 27, 2002, mailed Feb. 14, 2003.

PCT International Search Report, International Application No.: PCT/US00/22989 filed Aug. 22, 2000, mailed Aug. 15, 2001, 9 pages.

PCT International Search Report, International Application No.: PCT/US01/17993 filed May 31, 2001, mailed Sep. 28, 2001, 5 pages.

* cited by examiner

PREFETCHED DATA IN A DIGITAL BROADCAST SYSTEM

RELATED APPLICATION

This application is a continuation-in-part application of the parent application titled "Systems and Methods for Providing Video-On-Demand Services for Broadcasting Systems" filed on May 31, 2000, bearing application Ser. No. 09/584,832.

BRIEF DESCRIPTION OF THE INVENTION

This invention relates generally to data-on-demand systems. In particular, this invention relates to video-on-demand systems.

BACKGROUND OF THE INVENTION

Video-on-demand (VOD) systems are one type of data-on-demand (DOD) system. In VOD systems, video data files are provided by a server or a network of servers to one or more clients on a demand basis.

In a conventional VOD architecture, a server or a network of servers communicates with clients in a standard hierarchical client-server model. For example, a client sends a request to a server for a data file (e.g., a video data file). In response to the client request, the server sends the requested file to the client. In the standard client-server model, a client's request for a data file can be fulfilled by one or more servers. The client may have the capability to store any received data file locally in non-volatile memory for later use. The standard client-server model requires a two-way communications infrastructure. Currently, two-way communications requires building new infrastructure because existing cables can only provide one-way communications. Examples of two-way communications infrastructure-are hybrid fiber optics coaxial cables (HFC) or all fiber infrastructure. Replacing existing cables is very costly and the resulting services may not be affordable to most users.

In addition, the standard client-server model has many limitations when a service provider (e.g., a cable company) attempts to provide VOD services to a large number of clients. One limitation of the standard client-server model is that the service provider has to implement a mechanism to continuously listen and fulfill every request from each client within the network; thus, the number of clients who can receive service is dependent on the capacity of such a mechanism. One mechanism uses massively-parallel computers having large and fast disk arrays as local servers. However, even the fastest existing local server can only deliver video data streams to about 1000 to 2000 clients at one time. Thus, in order to service more clients, the number of local servers must increase. Increasing local servers requires more upper level servers to maintain control of the local servers.

Another limitation of the standard client-server model is that each client requires its own bandwidth. Thus, the total required bandwidth is directly proportional to the number of subscribing clients. Cache memory within local servers has been used to improve bandwidth limitation but using cache memory does not solve the problem because cache memory is also limited.

Presently, in order to make video-on-demand services more affordable for clients, existing service providers are increasing the ratio of clients per local server above the local server's capabilities. Typically, a local server, which is capable of providing service to 1000 clients, is actually committed to service 10,000 clients. This technique may work if most of the subscribing clients do not order videos at the same time. However, this technique is set up for failure because most clients are likely to want to view videos at the same time (i.e., evenings and weekends), thus, causing the local server to become overloaded.

Thus, it is desirable to provide a system that is capable of providing on-demand services to a large number of clients over virtually any transmission medium without replacing existing infrastructure.

SUMMARY OF THE INVENTION

In an exemplary embodiment, at a server side, a method for sending data to a client to provide data-on-demand services comprises the steps of: receiving a data file, specifying a time interval, parsing the data file into a plurality of data blocks based on the time interval such that each data block is displayable during the time interval, determining a required number of time slots to send the data file, allocating to each time slot at least a first of the plurality of data blocks and optionally one or more additional data blocks, such that the plurality of data blocks is available in sequential order to a client accessing the data file during any time slot, and sending the plurality of data blocks based on the allocating step. In one embodiment, the parsing step includes the steps of: determining an estimated data block size, determining a cluster size of a memory in a channel server, and parsing the data file based on the estimated data block size and the cluster size. In another embodiment, the determining step includes the step of assessing resource allocation and bandwidth availability.

In one embodiment, the method further comprises the steps of selecting a set of prefetch data blocks from the plurality of data blocks and separately sending the set of prefetch data blocks in a dedicated channel for sending prefetch data, program guide, commercials, firmware update, etc. In an exemplary embodiment, the step of selecting a set of prefetch data blocks includes the steps of: (1) determining a bandwidth reduction, a bandwidth allocation for prefetch data in the dedicated channel, and a delay time; and (2) selecting the prefetch data blocks based on the bandwidth reduction, the bandwidth allocation, and the delay time.

In another embodiment, the method further comprises the steps of receiving a request for a preview, randomly selecting a set of data blocks from the plurality of data blocks to compose the preview, and causing a display of the preview. In yet another embodiment, the method further comprises sending a set of commercial data blocks in the dedicated channel and causing a display of the set of commercial data blocks at predetermined times. In an exemplary embodiment, the commercial data blocks are continuously sent in the dedicated channel. In this embodiment, the step of displaying the set of commercial data blocks includes the steps of receiving a user selection of a price based on a frequency of commercial display and causing a display of the set of commercial data blocks based on the user selection.

In yet another embodiment, the method further comprises the steps of checking a packet header of the data file for an emergency bit, tuning to the dedicated channel to receive emergency information when the emergency bit is detected, and causing a display of the emergency information. In one embodiment, this method further comprises the steps of determining whether the emergency information is for a relevant region and displaying the emergency information if the emergency information is for the relevant region.

In an exemplary embodiment, at a client side, a method for processing data received from a server to provide data-on-demand services comprises the steps of: (a) receiving a selection of a data file during a first time slot; (b) receiving at least one data block of the data file during a second time slot; (c) during a next time slot: receiving any data block not already received, sequentially displaying a data block of the data file, and repeating step (c) until all data blocks of the data file has been received and displayed. In one embodiment, the method for processing data received from a server is performed by a set-top box at the client side.

In an exemplary embodiment, a data file is divided into a number of data blocks and a scheduling matrix is generated based on the number of data blocks. At the server side, the scheduling matrix provides a send order for sending the data blocks, such that a client can access the data blocks in sequential order at a random time. In an exemplary embodiment, a method for generating a scheduling matrix for a data file comprises the steps of: (a) receiving a number of data blocks [x] for a data file; (b) setting a first variable [j] to zero; (c) setting a second variable [i] to zero; (d) clearing all entries in a reference array; (e) writing at least one data block stored in matrix positions of a column [(i+j) modulo x] in a matrix to a reference array, if the reference array does not already contain the data block; (f) writing a data block [i] into the reference array and a matrix position [(i+j) modulo x, j] of the matrix, if the reference array does not contain the data block [i]; (g) incrementing the second variable [i] by one and repeating step (e) until the second variable [i] is equal to the number of data blocks [x]; and (h) incrementing the first variable [j] by one and repeating the step (c) until the first variable [j] is equal to the number of data blocks [x]. In one embodiment, a scheduling matrix is generated for each data file in a set of data files and a convolution method is applied to generate a delivery matrix based on the scheduling matrices for sending the set of data files.

A data-on-demand system comprises a first set of channel servers, a central controlling server for controlling the first set of channel servers, a first set of up-converters coupled to the first set of channel servers, a combiner/amplifier coupled to the first set of up-converters, and a combiner/amplifier adapted to transmit data via a transmission medium. In an exemplary embodiment, the data-on-demand system further comprises a channel monitoring module for monitoring the system, a switch matrix, a second set of channel servers, and a second set of up-converters. The channel monitoring module is configured to report to the central controlling server when system failure occurs. The central controlling server, in response to report from the channel monitoring module, instructs the switch matrix to replace a defective channel server in the first set of channel servers with a channel server in the second set of channel servers and a defective up-converter in the first set of up-converters with an up-converter in the second set of up-converters.

A method for providing data-on-demand services comprises the steps of calculating a delivery matrix of a data file, sending the data file in accordance with the delivery matrix, such that a large number of clients is capable of viewing the data file on demand. In one embodiment, the data file includes a video file.

DETAILED DESCRIPTION OF THE INVENTION

Figure 1A:
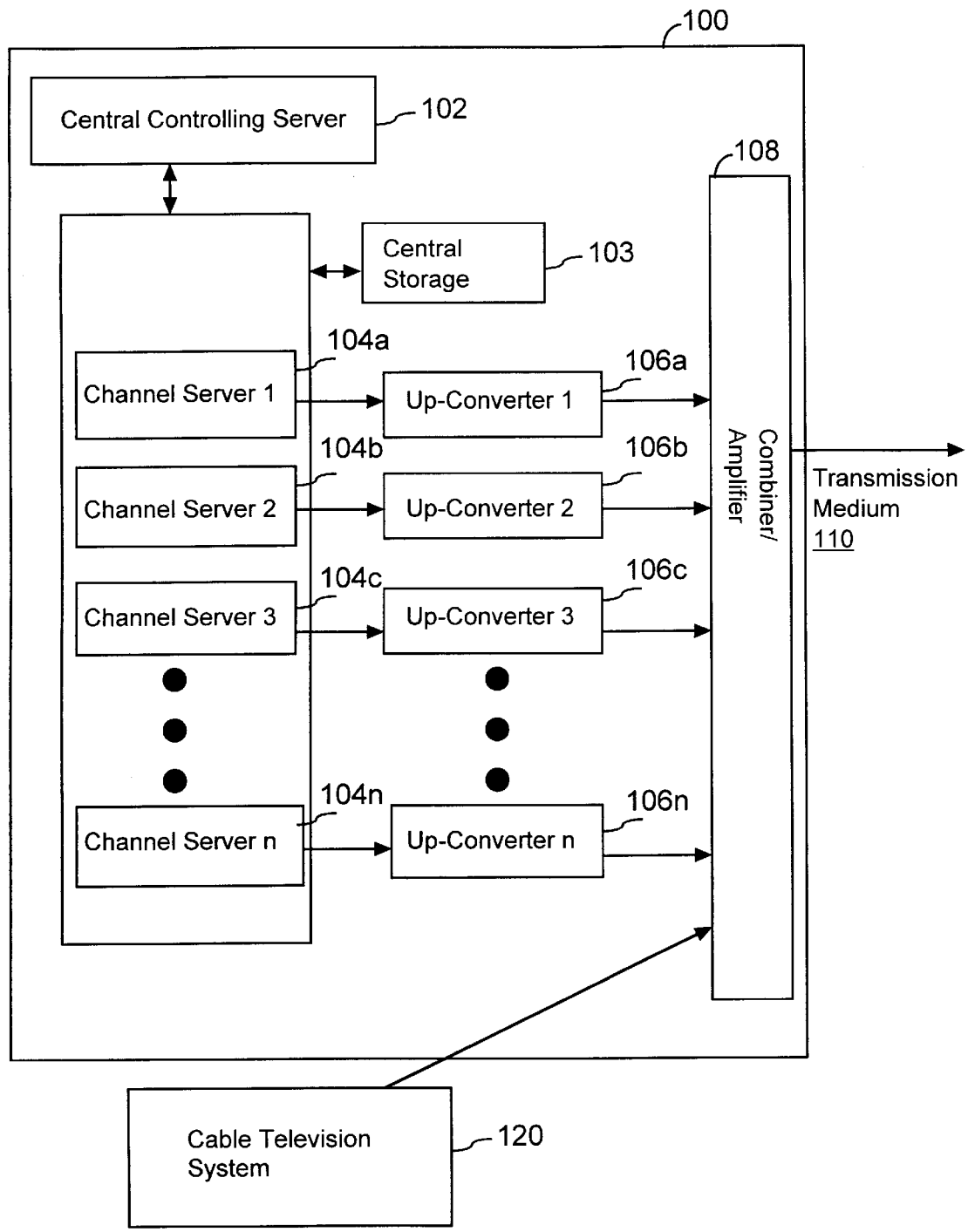
FIG. 1A illustrates an exemplary DOD system in accordance with an embodiment of the invention.

FIG. 1A illustrates an exemplary DOD system 100 in accordance with an embodiment of the invention. In this embodiment, the DOD system 100 provides data files, such as video files, on demand. However, the DOD system 100 is not limited to providing video files on demand but is also capable of providing other data files, for example, game files on demand. The DOD system 100 includes a central controlling server 102, a central storage 103, a plurality of channel servers 104a–104n, a plurality of up-converters 106a–106n, and a combiner/amplifier 108. The central controlling server 102 controls the channel servers 104. The central storage 103 stores data files in digital format. In an exemplary embodiment, data files stored in the central storage 103 are accessible via a standard network interface (e.g., ethernet connection) by any authorized computer, such as the central controller server 102, connected to the network. Each channel server 104 is assigned to a channel and is coupled to an up-converter 106. The channel servers 104 provide data files that are retrieved from the central storage 103 in accordance with instructions from the central controlling server 102. The output of each channel server 104 is a quadrature amplitude modulation (QAM) modulated intermediate frequency (IF) signal having a suitable frequency for the corresponding up-converter 106. The QAM-modulated IF signals are dependent upon adopted standards. The current adopted standard in the United States is the data-over-cable-systems-interface-specification (DOCSIS) standard, which requires an approximately 43.75 MHz IF frequency. The up-converters 106 convert IF signals received from the channel servers 104 to radio frequency signals (RF signals). The RF signals, which include frequency and bandwidth, are dependent on a desired channel and adopted standards. For example, under the current standard in the United States for a cable television channel 80, the RF signal has a frequency of approximately 559.25 MHz and a bandwidth of approximately 6 MHz. The outputs of the up-converters 106 are applied to the combiner/amplifier 108. The combiner/amplifier 108 amplifies, conditions, and combines the received RF signals then outputs the signals out to a transmission medium 110.

In an exemplary embodiment, the central controlling server 102 includes a graphics user interface (not shown) to enable a service provider to schedule data delivery by a drag-and-drop operation. Further, the central controlling server 102 authenticates and controls the channel servers 104 to start or stop according to delivery matrices. In an exemplary embodiment, the central controlling server 102 automatically selects a channel and calculates delivery matrices for transmitting data files in the selected channel. The central controlling server 102 provides offline addition, deletion, and update of data file information (e.g., duration, category, rating, and/or brief description). Further, the central controlling server 102 controls the central storage 103 by updating data files and databases stored therein.

In an exemplary embodiment, an existing cable television system 120 may continue to feed signals into the combiner/ amplifier 108 to provide non-DOD services to clients. Thus, the DOD system 100 in accordance with the invention does not disrupt present cable television services.

Figure 1B:
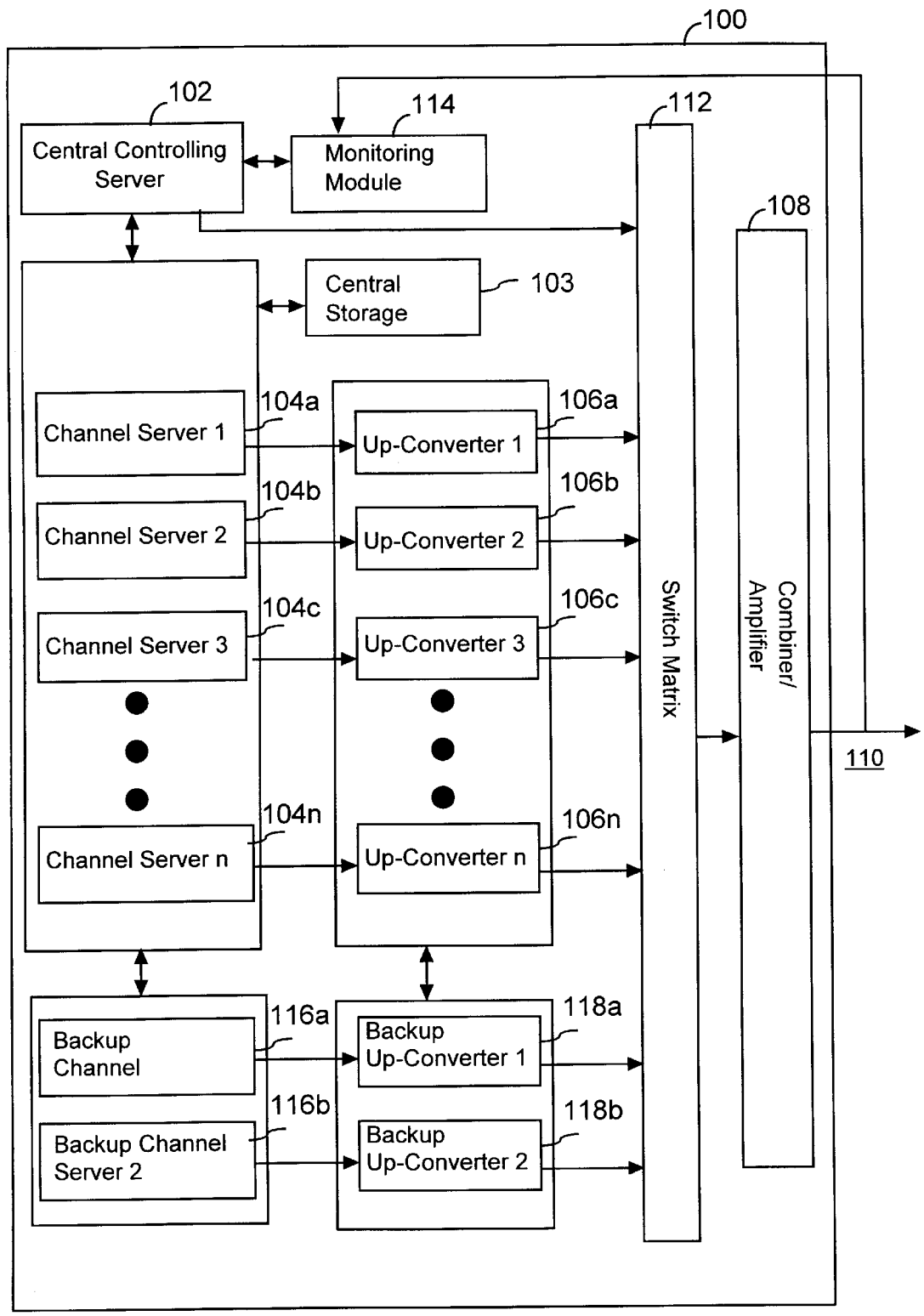
FIG. 1B illustrates an exemplary DOD system in accordance with another embodiment of the invention.

FIG. 1B illustrates another exemplary embodiment of the DOD system 100 in accordance with the invention. In addition to the elements illustrated in FIG. 1A, the DOD system 100 includes a switch matrix 112, a channel monitoring module 114, a set of back-up channel servers 116a–116b, and a set of back-up up-converters 118a–118b. In one embodiment, the switch matrix 112 is physically located between the up-converters 106 and the combiner/amplifier 108. The switch matrix 112 is controlled by the central controlling server 102. The channel monitoring module 114 comprises a plurality of configured set-top boxes, which simulate potential clients, for monitoring the health of the DOD system 100. Monitoring results are communicated by the channel monitoring module 114 to the central controlling server 102. In case of a channel failure (i.e., a channel server failure, an up-converter failure, or a communication link failure), the central controlling server 102 through the switch matrix 112 disengages the malfunctioning component and engages a healthy backup component 116 and/or 118 to resume service.

In an exemplary embodiment, data files being broadcasted from the DOD system 100 are contained in motion pictures expert group (MPEG) files. Each MPEG file is dynamically divided into data blocks and sub-blocks mapping to a particular portion of a data file along a time axis. These data blocks and sub-blocks are sent during a pre-determined time in accordance with three-dimensional delivery matrices provided by the central controlling server 102. A feedback channel is not necessary for the DOD system 100 to provide DOD services. However, if a feedback channel is available, the feedback channel can be used for other purpose, such as billing or providing Internet services.

Figure 2:
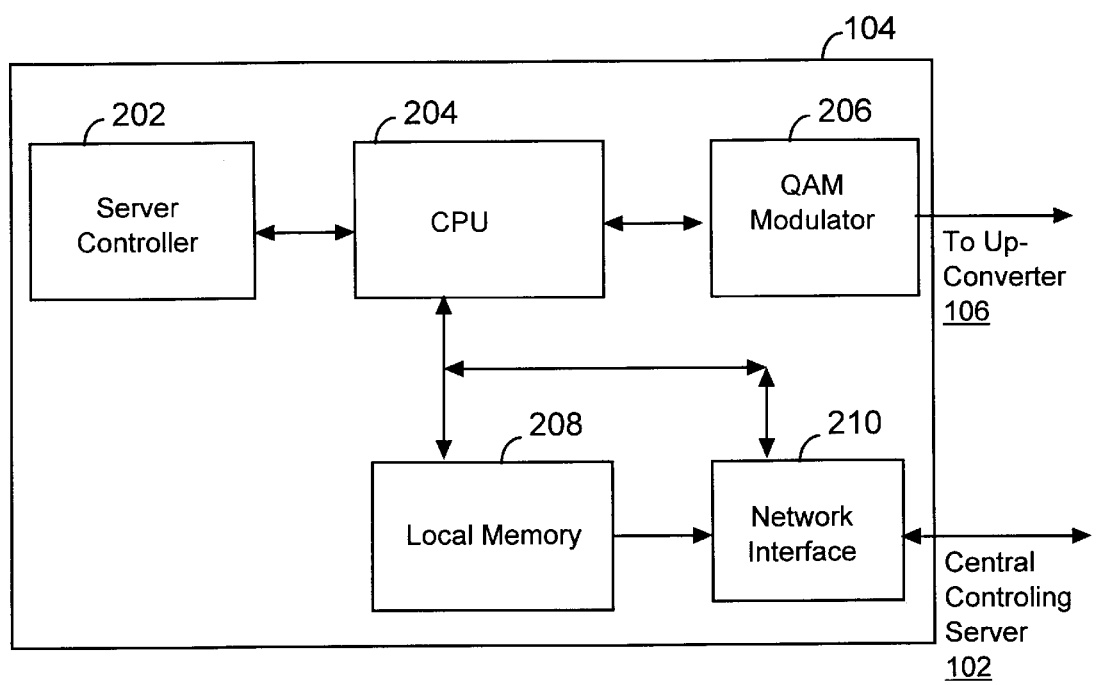
FIG. 2 illustrates an exemplary channel server in accordance with an embodiment of the invention.

FIG. 2 illustrates an exemplary channel server 104 in accordance with an embodiment of the invention. The channel server 104 comprises a server controller 202, a CPU 204, a QAM modulator 206, a local memory 208, and a network interface 210. The server controller 202 controls the overall operation of the channel server 104 by instructing the CPU 204 to divide data files into blocks (further into sub-blocks and data packets), select data blocks for transmission in accordance with a delivery matrix provided by the central controlling server 102, encode selected data, compress encoded data, then deliver compressed data to the QAM modulator 206. The QAM modulator 206 receives data to be transmitted via a bus (i.e., PCI, CPU local bus) or Ethernet connections. In an exemplary embodiment, the QAM modulator 206 may include a downstream QAM modulator, an upstream quadrature amplitude modulation/quadrature phase shift keying (QAM/QPSK) burst demodulator with forward error correction decoder, and/or an upstream tuner. The output of the QAM modulator 206 is an IF signal that can be applied directly to an up-converter 106.

The network interface 210 connects the channel server 104 to other channel servers 104 and to the central controlling server 102 to execute the scheduling and controlling instructions from the central controlling server 102, reporting status back to the central controlling server 102, and receiving data files from the central storage 103. Any data file retrieved from the central storage 103 can be stored in the local memory 208 of the channel server 104 before the data file is processed in accordance with instructions from the server controller 202. In an exemplary embodiment, the channel server 104 may send one or more DOD data streams depending on the bandwidth of a cable channel (e.g., 6, 6.5, or 8 MHz), QAM modulation (e.g., QAM 64 or QAM 256), and a compression standard/bit rate of the DOD data stream (i.e., MPEG-1 or MPEG-2).

Figure 3:
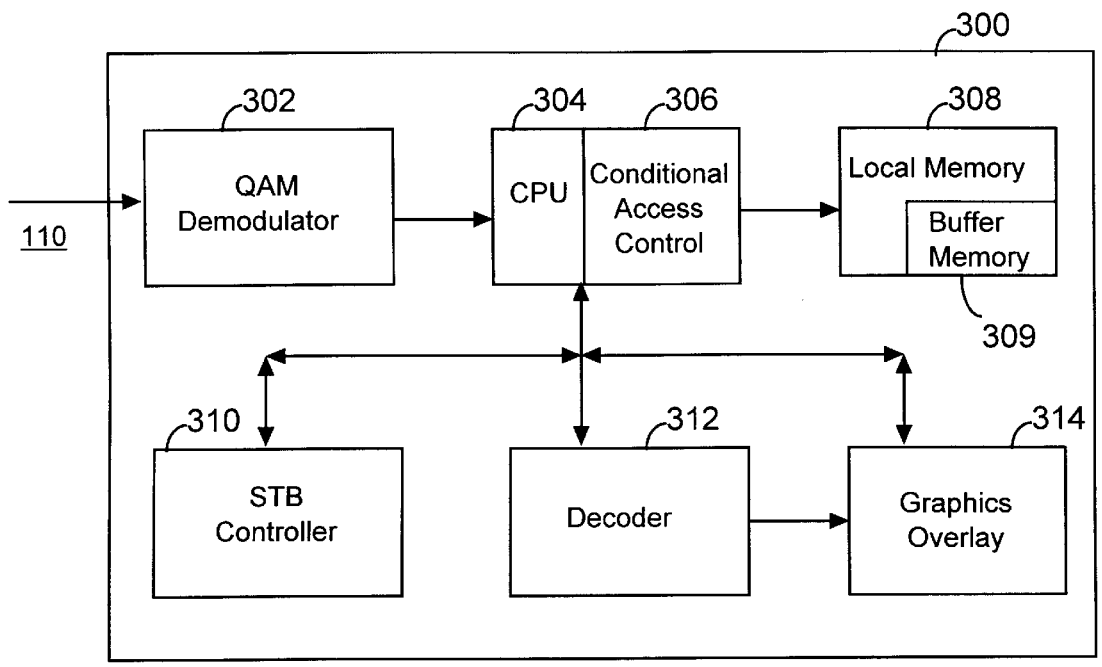
FIG. 3 illustrates an exemplary set-top box in accordance with an embodiment of the invention.

FIG. 3 illustrates an exemplary set-top box (STB) 300 in accordance with an embodiment of the invention. The STB 300 comprises a QAM demodulator 302, a CPU 304, a conditional access module 306 (e.g., a smart card system), a local memory 308, a buffer memory 309, a STB controller 310, a decoder 312, and a graphics overlay module 314. The STB controller 310 controls the overall operation of the STB 300 by controlling the CPU 302 and the QAM demodulator 302 to select data in response to a client's request, decode selected data, decompress decoded data, reassemble decoded data, store decoded data in the local memory 308 or the buffer memory 309, and deliver stored data to the decoder 312. In an exemplary embodiment, the STB controller 310 controls the overall operation of the STB 300 based on data packet headers in the data packets received from the transmission medium 110. In an exemplary embodiment, the local memory 308 comprises non-volatile memory (e.g., a hard drive) and the buffer memory 309 comprises volatile memory.

In one embodiment, the QAM demodulator 302 comprises transmitter and receiver modules and one or more of the following: privacy encryption/decryption module, forward error correction decoder/encoder, tuner control, downstream and upstream processors, CPU and memory interface circuits. The QAM demodulator 302 receives modulated IF signals, samples and demodulates the signals to restore data.

The conditional access module 306 permits a decoding process when access is granted after authentication and/or when appropriate fees have been charged. Access condition is determined by the service provider.

In an exemplary embodiment, when access is granted, the decoder 312 decodes at least one data block to transform the data block into images displayable on an output screen. The decoder 312 supports commands from a subscribing client, such as play, stop, pause, step, rewind, forward, etc.

The graphics overlay module 314 enhances displayed graphics quality by, for example, providing alpha blending or picture-in-picture capabilities. In an exemplary embodiment, the graphics overlay module 314 can be used for graphics acceleration during game playing mode, for example, when the service provider provides games-on-demand services using the system in accordance with the invention.

In an exemplary embodiment, although data files are broadcasted to all cable television subscribers, only the DOD subscriber who has a compatible STB 300 will be able to decode and enjoy data-on-demand services. In one exemplary embodiment, permission to obtain data files on demand can be obtained via a smart card system in the conditional access control module 306. A smart card may be rechargeable at a local store or vending machine set up by a service provider. In another exemplary embodiment, a flat fee system provides a subscriber unlimited access to all available data files.

In an exemplary embodiment, data-on-demand interactive features permit a client to select at any time an available data file. The amount of time between when a client presses a select button and the time the selected data file begins playing is referred to as a response time. As more resources are allocated (e.g., bandwidth, server capability) to provide DOD services, the response time gets shorter. In an exemplary embodiment, a response time can be determined based on an evaluation of resource allocation and desired quality of service.

In an exemplary embodiment, a selected response time determines the duration of a time slot. The duration of a time slot (TS) is the time interval for playing a data video file, is divided into a number of data blocks such that each data block can support the playing of the data file for the duration of a time slot.

In one embodiment, the number of data blocks (NUM_OF_BLKS) for each data file can be calculated as follows:

Estimated_BLK_Size = (DataFile_Size * TS)/DataFile_Length  (1)
BLK SIZE = (Estimated BLK Size + CLUSTER_SIZE − 1 Byte)/ CLUSTER_SIZE  (2)
BLK_SIZE_BYTES = BLK_SIZE * CLUSTER_SIZE  (3)
NUM_OF_BLKS = (DataFile_Size + BLK_SIZE_BYTES − 1 Byte)/BLK_SIZE_BYTES  (4)

In equations (1) to (4), the Estimated_BLK_Size is an estimated block size (in Bytes); the DataFile_Size is the data file size (in Bytes); TS represents the duration of a time slot (in seconds); DataFile_Length is the duration of the data file (in seconds); BLK SIZE is the number of clusters needed for each data block; CLUSTER_SIZE is the size of a cluster in the local memory 208 for each channel server 104 (e.g., 64 KBytes); BLK_SIZE_BYTES is a block size in Bytes. In this embodiment, the number of blocks (NUM_OF_BLKS) is equal to the data file size (in Bytes) plus a data block size in Bytes minus 1 Byte and divided by a data block size in Bytes. Equations (1) to (4) illustrate one specific embodiment. A person of skill in the art would recognize that other methods are available to calculate a number of data blocks for a data file. For example, dividing a data file into a number of data blocks is primarily a function of an estimated block size and the cluster size of the local memory 208 of a channel server 104. Thus, the invention should not be limited to the specific embodiment presented above.

Figure 4:
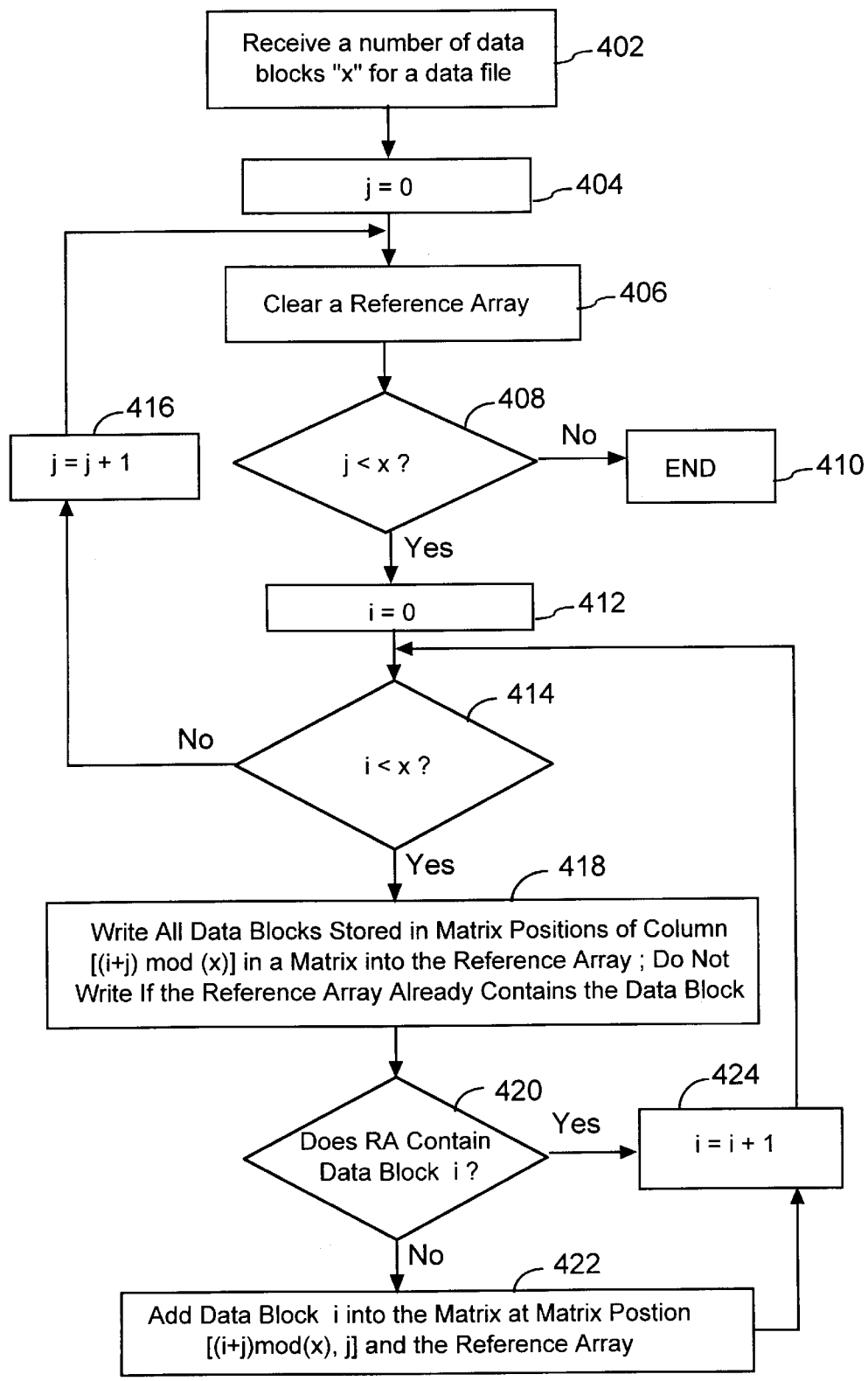
FIG. 4 illustrates an exemplary process for generating a scheduling matrix in accordance with an embodiment of the invention.

FIG. 4 illustrates an exemplary process for generating a scheduling matrix for sending a data file in accordance with an embodiment of the invention. In an exemplary embodiment, this invention uses time division multiplexing (TDM) and frequency division multiplexing (FDM) technology to compress and schedule data delivery at the server side. In an exemplary embodiment, a scheduling matrix is generated for each data file. In one embodiment, each data file is divided into a number of data blocks and the scheduling matrix is generated based on the number of data blocks. Typically, a scheduling matrix provides a send order for sending data blocks of a data file from a server to clients, such that the data blocks are accessible in sequential order by any client who wishes to access the data file at a random time.

At step 402, a number of data blocks (x) for a data file is received. A first variable, j, is set to zero (step 404). A reference array is cleared (step 406). The reference array keeps track of data blocks for internal management purposes. Next, j is compared to x (step 408). If j is less than x, a second variable, i, is set to zero (step 412). Next, i is compared to x (step 414). If i is less than x, data blocks stored in the column [(i+j) modulo (x)] of a scheduling matrix are written into the reference array (step 418). If the reference array already has such data block(s), do not write a duplicate copy. Initially, since the scheduling matrix does not yet have entries, this step can be skipped. Next, the reference array is checked if it contains data block i (step 420). Initially, since all entries in the reference array has been cleared at step 406, there would be nothing in the reference array. If the reference array does not contain data block i, data block i is added into the scheduling matrix at matrix position [(i+j) modulo (x), j] and the reference array (step 422). After the data block i is added to the scheduling matrix and the reference array, i is incremented by 1, such that i=i+1 (step 424), then the process repeats at step 414 until i=x. If the reference array contains data block i, i is incremented by 1, such that i=i+1 (step 424), then the process repeats at step 414 until i=x. When i=x, j is incremented by 1, such that j=j+1 (step 416) and the process repeats at step 406 until j=x. The entire process ends when j=x (step 410).

In an exemplary embodiment, if a data file is divided into six data blocks (x=6), the scheduling matrix and the reference arrays are as follows:

| Scheduling Matrix (SM) | | | | | |
|---|---|---|---|---|---|
| TS0 | TS1 | TS2 | TS3 | TS4 | TS5 |
| [0, 0] blk0 | [1, 0] blk1 | [2, 0] blk2 | [3, 0] blk3 | [4, 0] blk4 | [5, 0] blk5 |
| [0, 1] | [1, 1] blk0 | [2, 1] | [3,1] | [4, 1] | [5, 0] |
| [0, 2] | [1, 2] | [2, 2] blk0 | [3, 2] blk1 | [4, 2] | [5, 1] |
| [0, 3] | [1, 3] | [2, 3] | [3, 3] blk0 | [4, 3] | [5, 2] blk2 |
| [0, 4] | [1, 4] blk3 | [2, 4] | [3, 4] | [4, 4] blk0 | [5, 3] blk1 |
| [0, 5] | [1, 5] | [2, 5] | [3, 5] blk4 | [4, 5] | [5, 4] blk0 |

| Reference Array (RA) | | | | | |
|---|---|---|---|---|---|
| | space0 | space 1 | space 2 | space3 | space4 | space5 |
| TS0 | blk0 | blk1 | blk2 | blk3 | blk4 | blk5 |
| TS1 | blk1 | blk0 | blk2 | blk3 | blk4 | blk5 |
| TS2 | blk2 | blk0 | blk3 | blk1 | blk4 | blk5 |
| TS3 | blk3 | blk1 | blk0 | blk4 | blk5 | blk2 |
| TS4 | blk4 | blk0 | blk5 | blk2 | blk1 | blk3 |
| TS5 | blk5 | blk2 | blk1 | blk0 | blk3 | blk4 |

In this exemplary embodiment, based on the scheduling matrix above, the six data blocks of the data file are sent in the following sequence:

| | |
|---|---|
| TS0 | => blk0 |
| TS1 | => blk0, blk1, blk3 |
| TS2 | => blk0, blk2 |
| TS3 | => blk0, blk1, blk3, blk4 |
| TS4 | => blk0, blk4 |
| TS5 | => blk0, blk1, blk2, blk5 |

In another exemplary embodiment, a look-ahead process can be used to calculate a look-ahead scheduling matrix to send a predetermined number of data blocks of a data file prior to a predicted access time. For example, if a predetermined look-ahead time is the duration of one time slot, for any time slot greater than or equal to time slot number four, data block 4 (blk4) of a data file should be received by a STB 300 at a subscribing client at or before TS3, but blk4 would not be played until TS4. The process steps for generating a look-ahead scheduling matrix is substantially similar to the process steps described above for FIG. 4 except that the look-ahead scheduling matrix in this embodiment schedules an earlier sending sequence based on a look-ahead time. Assuming a data file is divided into six data blocks, an exemplary sending sequence based on a look-ahead scheduling matrix, having a look-ahead time of the duration of two time slots, can be represented as follows:

| | |
|---|---|
| TS0 | => blk0 |
| TS1 | => blk0, blk1, blk3, blk4 |
| TS2 | => blk0, blk2 |
| TS3 | => blk0, blk1, blk3, blk4, blk5 |
| TS4 | => blk0, blk5 |
| TS5 | => blk0, blk1, blk2 |

A three-dimensional delivery matrix for sending a set of data files is generated based on the scheduling matrices for each data file of the set of data files. In the three-dimensional delivery matrix, a third dimension containing IDs for each data file in the set of data files is generated. The three-dimensional delivery matrix is calculated to efficiently utilize available bandwidth in each channel to deliver multiple data streams. In an exemplary embodiment, a convolution method, which is well known in the art, is used to generate a three-dimensional delivery matrix to schedule an efficient delivery of a set of data files. For example, a convolution method may include the following policies: (1) the total number of data blocks sent in the duration of any time slot (TS) should be kept at a smallest possible number; and (2) if multiple partial solutions are available with respect to policy (1), the preferred solution is the one which has a smallest sum of data blocks by adding the data blocks to be sent during the duration of any reference time slot, data blocks to be sent during the duration of a previous time slot (with respect to the reference time slot), and data blocks to be sent during the duration of a next time slot (with respect to the reference time slot). For example, assuming an exemplary system sending two short data files, M and N, where each data file is divided into six data blocks, the sending sequence based on a scheduling matrix is as follows:

| | |
|---|---|
| TS0 | => blk0 |
| TS1 | => blk0, blk1, blk3 |
| TS2 | => blk0, blk2 |
| TS3 | => blk0, blk1, blk3, blk4 |
| TS4 | => blk0, blk4 |
| TS5 | => blk0, blk1, blk2, blk5 |

Applying the exemplary convolution method as described above, possible combinations of delivery matrices are as follows:

| | Total Data Blocks |
|---|---|
| Option 1: Send video file N at shift 0 TS | |
| TS0 => M0, N0 | 2 |
| TS1 => M0, M1, M3, N0, N1, N3 | 6 |
| TS2 => M0, M2, N0, N2 | 4 |
| TS3 => M0, M1, M3, M4, N0, N1, N3, N4 | 8 |
| TS4 => M0, M4, N0, N4 | 4 |
| TS5 => M0, M1, M2, M5, N0, N1, N2, N5 | 8 |
| Option 2: Send video file N at shift 1 TS | |
| TS0 => M0, N0, N1, N3 | 4 |
| TS1 => M0, M1, M3, N0, N2 | 5 |
| TS2 => M0, M2, N0, N1, N3, N4 | 6 |
| TS3 => M0, M1, M3, M4, N0, N4 | 6 |
| TS4 => M0, M4, N0, N1, N2, N5 | 6 |
| TS5 => M0, M1, M2, M5, N0 | 5 |
| Option 3: Send video file N at shift 2 TS | |
| TS0 => M0, N0, N2 | 3 |
| TS1 => M0, M1, M3, N0, N1, N3, N4 | 7 |
| TS2 => M0, M2, N0, N4 | 4 |
| TS3 => M0, M1, M3, M4, N0, N1, N2, N5 | 8 |
| TS4 => M0, M4, N0 | 3 |
| TS5 => M0, M1, M2, M5, N0, N1, N3 | 7 |
| Option 4: Send video file N at shift 3 TS | |
| TS0 => M0, N0, N1, N3, N4 | 5 |
| TS1 => M0, M1, M3, N0, N4 | 5 |
| TS2 => M0, M2, N0, N1, N2, N5 | 6 |
| TS3 => M0, M1, M3, M4, N0 | 5 |
| TS4 => M0, M4, N0, N1, N3 | 5 |
| TS5 => M0, M1, M2, M5, N0, N2 | 6 |
| Option 5: Send video file N at shift 4 TS | |
| TS0 => M0, N0, N4 | 3 |
| TS1 => M0, M1, M3, N0, N1, N2, N5 | 7 |
| TS2 => M0, M2, N0 | 3 |
| TS3 => M0, M1, M3, M4, N0, N1, N3 | 7 |
| TS4 => M0, M4, N0, N2 | 4 |
| TS5 => M0, M1, M2, M5, N0, N1, N3, N4 | 8 |
| Option 6: Send video file N at shift 5 TS | |
| TS0 => M0, N0, N1, N2, N5 | 5 |
| TS1 => M0, M1, M3, N0 | 4 |
| TS2 => M0, M2, N0, N1, N3 | 5 |
| TS3 => M0, M1, M3, M4, N0, N2 | 6 |
| TS4 => M0, M4, N0, N1, N3, N4 | 6 |
| TS5 => M0, M1, M2, M5, N0, N4 | 6 |

Applying policy (1), options 2, 4, and 6 have the smallest maximum number of data blocks (i.e., 6 data blocks) sent during any time slot. Applying policy (2), the optimal delivery matrix in this exemplary embodiment is option 4 because option 4 has the smallest sum of data blocks of any reference time slot plus data blocks of neighboring time slots (i.e., 16 data blocks). Thus, optimally for this embodiment, the sending sequence of the data file N should be shifted by three time slots. In an exemplary embodiment, a three-dimensional delivery matrix is generated for each channel server 104.

When data blocks for each data file are sent in accordance with a delivery matrix, a large number of subscribing clients can access the data file at a random time and the appropriate data blocks of the data file will be timely available to each subscribing client. In the example provided above, assume the duration of a time slot is equal to 5 seconds, the DOD system 100 sends data blocks for data files M and N in accordance with the optimal delivery matrix (i.e., shift delivery sequence of data file N by three time slots) in the following manner:

| | |
|---|---|
| Time 00:00:00 | => M0 N0 N1 N3 N4 |
| Time 00:00:05 | => M0 M1 M3 N0 N4 |
| Time 00:00:10 | => M0 M2 N0 N1 N2 N5 |
| Time 00:00:15 | => M0 M1 M3 M4 N0 |
| Time 00:00:20 | => M0 M4 N0 N1 N3 |
| Time 00:00:25 | => M0 M1 M2 M5 N0 N2 |
| Time 00:00:30 | => M0 N0 N1 N3 N4 |
| Time 00:00:35 | => M0 M1 M3 N0 N4 |
| Time 00:00:40 | => M0 M2 N0 N1 N2 N5 |
| Time 00:00:45 | => M0 M1 M3 M4 N0 |

-continued

Time 00:00:50 => M0 M4 N0 N1 N3
Time 00:00:55 => M0 M1 M2 M5 N0 N2

If at time 00:00:00 a client A selects movie M, the STB 300 at client A receives, stores, plays, and rejects data blocks as follows:

Time 00:00:00 => Receive M0    => play M0, store M0.
Time 00:00:05 => Receive M1, M3    => play M1, store M0, M1, M3.
Time 00:00:10 => Receive M2    => play M2, store M0, M1, M2 M3.
Time 00:00:15 => Receive M4    => play M3, store M0, M1, M2, M3, M4.
Time 00:00:20 => Receive none    => play M4, store M0, M1, M2, M3, M4.
Time 00:00:25 => Receive M5    => play M5, store M0, M1, M2, M3, M4, M5.

If at time 00:00: 10, a client B selects movie M, the STB 300 at client B receives, stores, plays, and rejects data blocks as follows:

Time 00:00:10 => Rcv M0, M2    => play M0, store M0, M2.
Time 00:00:15 => Rcv M1, M3, M4    => play M1, store M0, M1, M2, M3, M4.
Time 00:00:20 => Rcv none    => play M2, store M0, M1, M2, M3, M4.
Time 00:00:25 => Rcv M5    => play M3, store M0, M1, M2, M3, M4, M5.
Time 00:00:30 => Rcv none    => play M4, store M0, M1, M2, M3, M4, M5.
Time 00:00:35 => Rcv none    => play M5, store M0, M1, M2, M3, M4, M5.

If at time 00:00: 15, a client C selects movie N, the STB 300 of the client C receives, stores, plays, and rejects data blocks as follows:

Time 00:00:15 => Rcv N0    => play N0, store N0.
Time 00:00:20 -> Rcv N1 N3    -> play N1, store N0, N1, N3.
Time 00:00:25 => Rcv N2    => play N2, store N0, N1, N2, N3.
Time 00:00:30 => Rcv N4    => play N3, store N0, N1, N2, N3, N4.
Time 00:00:35 => Rcv none    => play N4, store N0, N1, N2, N3, N4.
Time 00:00:40 => Rcv N5    => play N5, store N0, N1, N2, N3, N4, N5.

If at time 00:00:30, a client D also selects movie N, the STB 300 at the client D receives, stores, plays, and rejects data blocks as follows:

Time 00:00:30 => Rcv N0, N1, N3, N4    => play N0, store N0, N1, N3, N4.
Time 00:00:35 => Rcv none    => play N1, store N0, N1, N3, N4.
Time 00:00:40 =22 Rcv N2, N5    => play N2, store N0, N1, N2, N3, N4, N5.
Time 00:00:45 => Rcv none    => play N3, store N0, N1, N2, N3, N4, N5.
Time 00:00:50 => Rcv none    => play N4, store N0, N1, N2, N3, N4, N5.
Time 00:00:55 => Rcv none    -> play N5, store N0, N1, N2, N3, N4, N5.

As shown in the above examples, any combination of clients can at a random time independently select and begin playing any data file provided by the service provider.

General Operation

A service provider can schedule to send a number of data files (e.g., video files) to channel servers 104 prior to broadcasting. The central controlling server 102 calculates and sends to the channel servers 104 three-dimensional delivery matrices (ID, time slot, and data block send order). During broadcasting, channel servers 104 consult the three-dimensional delivery matrices to send appropriate data blocks in an appropriate order. Each data file is divided into data blocks so that a large number of subscribing clients can separately begin viewing a data file continuously and sequentially at a random time. The size of a data block of a data file is dependent on the duration of a selected time slot and the bit rate of the data stream of the data file. For example, in a constant bit rate MPEG data stream, each data block has a fixed size of: Block Size (MBytes)=BitRate (Mb/s)×TS (sec)/8 (1).

In an exemplary embodiment, a data block size is adjusted to a next higher multiple of a memory cluster size in the local memory 208 of a channel server 104. For example, if a calculated data block length is 720 Kbytes according to equation (1) above, then the resulting data block length should be 768 KBytes if the cluster size of the local memory 208 is 64 KBytes. In this embodiment, data blocks should be further divided into multiples of sub-blocks each having the same size as the cluster size. In this example, the data block has twelve sub-blocks of 64 KBytes.

A sub-block can be further broken down into data packets. Each data packet contains a packet header and packet data. The packet data length depends on the maximum transfer unit (MTU) of a physical layer where each channel server's CPU sends data to. In the preferred embodiment, the total size of the packet header and packet data should be less than the MTU. However, for maximum efficiency, the packet data length should be as long as possible.

In an exemplary embodiment, data in a packet header contains information that permits the subscriber client's STB 300 to decode any received data and determine if the data packet belongs to a selected data file (e.g., protocol signature, version, ID, or packet type information). The packet header may also contain other information, such as block/sub-block/packet number, packet length, cyclic redundancy check (CRC) and offset in a sub-block, and/or encoding information.

Once received by a channel server 104, data packets are sent to the QAM modulator 206 where another header is added to the data packet to generate a QAM-modulated IF output signal. The maximum bit rate output for the QAM modulator 206 is dependent on available bandwidth. For example, for a QAM modulator 206 with 6 MHz bandwidth, the maximum bit rate is 5.05 (bit/symbol)×6 (MHz)=30.3 Mbit/sec.

The QAM-modulated IF signals are sent to the up-converters 106 to be converted to RF signals suitable for a specific channel (e.g., for CATV channel 80, 559.250 MHz and 6 MHz bandwidth). For example, if a cable network has high bandwidth (or bit rate), each channel can be used to provide more than one data stream, with each data stream occupying a virtual sub-channel. For example, three MPEG1 data streams can fit into a 6 MHz channel using QAM modulation. The output of the up-converters 106 is applied to the combiner/amplifier 108, which sends the combined signal to the transmission medium 110.

In an exemplary embodiment, the total system bandwidth (BW) for transmitting "N" data streams is BW=N×bw, where bw is the required bandwidth per data stream. For example, three MPEG-1 data streams can be transmitted at the same time by a DOCSIS cable channel having a system bandwidth of 30.3 Mbits/sec because each MPEG-1 data stream occupies 9 Mbits/sec of the system bandwidth.

Typically, bandwidth is consumed regardless of the number of subscribing clients actually accessing the DOD service. Thus, even if no subscribing client is using the DOD service, bandwidth is still consumed to ensure the on-demand capability of the system.

In an exemplary embodiment, the total system bandwidth (BW) may be reduced by prefetching some data blocks of each data file. Prefetch data blocks are continuously sent in a separate, dedicated channel. In one embodiment, the prefetch data blocks for a data file are sent sequentially in a group. By sending prefetch data blocks, the total system bandwidth (BW) needed for delivering the remaining data blocks is reduced. After determining a desirable number of prefetch data blocks to be sent in a separate channel, the schedule for sending the remaining data blocks should be adjusted so that the prefetch data blocks are not sent again with other data blocks.

For example, in the exemplary schedule matrix above, where a data file is divided into six data blocks, if the first data block "b0" and the second data block "b1" are both prefetch data blocks, the schedule matrix should be modified to be as follows for the remaining data blocks (b2–b5):

```
TS0 => [nothing]
TS1 => blk3
TS2 => blk2
TS3 => blk3, blk4
TS4 => blk4
TS5 => blk2, blk5
```

In the above example, if b0 is the only prefetch data block, the total bandwidth for sending the remaining data blocks (b1–b5) of the data file is reduced by 37.5% [i.e., six data blocks removed from a total of sixteen data blocks]. Next, if data block "b1" is also a prefetch data block, the bandwidth for sending the remaining data blocks (b2–b5) is reduced by an additional 12.5%. Thus, the incremental bandwidth reduction for prefetching b1 is not as great as prefetching b0. Because the incremental bandwidth reduction diminishes as more data blocks are prefetched, an optimal number of prefetch data blocks for each data file can be determined based on a desired bandwidth reduction. In an exemplary embodiment, the bandwidth saved by prefetching data blocks x to y of a data file can be estimated by the following equation:

$$\Sigma(1/n); n=(x+1) \text{ to } (y+1)$$

In addition, as the number of prefetch data blocks increases, the prefetch delay time increases. The prefetch delay time is determined based on the size of a data block for each data file, the number of prefetch data blocks per data file, the number of data files being sent, and the allocated prefetch bandwidth in the dedicated channel. In an exemplary embodiment, all prefetch data blocks for each file are sent sequentially and continuously in the dedicated channel, one data block per time slot. A person skilled in the art would recognize that as the number of prefetch data blocks increases, the longer the prefetch delay time. Thus, when determining an optimal number of prefetch data blocks for each data file, an acceptable prefetch delay time should be considered.

For example, if data blocks b0 and b1 of data files M and N are to be prefetched in the dedicated channel, these prefetch data blocks can be sent in the following manner:

M0 M1 N0 N1 M0 M1 N0 N1 . . .

Assuming a given allocated prefetch bandwidth of PRF_BW (Mb/s), in an exemplary embodiment, a prefetch delay time can be calculated as follows: Prefetch delay time=[data block size (Mbytes)*number of prefetch data blocks* (number of data files to be sent+1)*8]/PRF_BW (Mb/s)

In an exemplary embodiment, a prefetch cycle time (PRF_TIME), which is the time required to send a complete round of prefetched data blocks for all data files being sent, can be calculated as follows: Prefetch cycle time=[data block size (Mbytes)*number of prefetch data blocks*number of data files to be sent*8 ]/PRF_BW (Mb/s).

In one embodiment, to reduce the prefetch delay time, prefetch data blocks of a new data file are sent more frequently than prefetch data blocks in an old data file (e.g., a data file that has been sent continuously for a predetermined amount of time). Fox example, if M is an old data file and N is a new data file, the prefetch data blocks are sent in the following manner:

N0 N1 N0 N1 M0 M1 N0 N1 N0 N1 M0 M1 . . .

The STB 300, once turned on, continuously receives and updates a program guide stored in the local memory 308 of a STB 300. In an exemplary embodiment, the STB 300 displays data file information including the latest program guide on a TV screen. Data file information, such as video file information, may include movieID, movie title, description (in multiple languages), category (e.g., action, children), rating (e.g., R, PG13), cable company policy (e.g., price, length of free preview), subscription period, movie poster, and movie preview. In an exemplary embodiment, data file information is sent via the dedicated channel, such as a channel reserved for firmware update, commercials, and/or emergency information. In another exemplary embodiment, information is sent in a physical channel shared by other data streams. In an exemplary embodiment, while the STB 300 is not playing any data file, the STB 300 is tuned into the dedicated channel and is ready to receive and update prefetch data blocks that have not yet been received.

In an exemplary embodiment, previews are comprised of randomly selected data blocks in a data stream of a data file. Thus, a user who selects a preview of a data file multiple times is unlikely to view an identical preview. An advantage of randomly composed previews is that the DOD system 100 does not need extra bandwidth to broadcast a predetermined preview program. Instead, the DOD system 100 randomly selects data blocks in the normal data stream of a data file after a user requests to view a preview of that data file. In a preferred embodiment, some data blocks cannot become a part of any preview. For example, if a data file provides a movie, the data blocks of the second half of the movie should not become a part of a randomly selected preview.

A subscribing client can view a list of available data files arranged by categories displayed on a television screen. When the client selects one of the available data files, the STB 300 controls its hardware to tune into a corresponding physical channel and/or a virtual sub-channel to start receiving data packets for that data file. The STB 300 examines every data packet header, decodes data in the data packets, and determines if a received data packet should be retained. If the STB 300 determines that a data packet should not be retained, the data packet is discarded. Otherwise, the packet data is saved in the local memory 308 for later retrieval or is temporarily stored in the buffer memory 309 until it is sent to the decoder 312.

To improve performance efficiency by avoiding frequent read/write into the local memory 308, in an exemplary embodiment, the STB 300 uses a "sliding window" anticipation technique to lock anticipated data blocks in the memory buffer 309 whenever possible. Data blocks are transferred to the decoder 312 directly out of the memory buffer 309 if a hit in an anticipation window occurs. If an anticipation miss occurs, data blocks are read from the local memory 308 into the memory buffer 309 before the data blocks are transferred to the decoder 312 from the memory buffer 309.

In an exemplary embodiment, the STB 300 responds to subscribing client's commands via infrared (IR) remote control unit buttons, an IR keyboard, or front panel pushbuttons, including buttons to pause, play in slow motion, rewind, zoom and single step. In an exemplary embodiment, if a subscribing client does not input any action for a predetermined period of time (e.g., scrolling program menu, or selecting a category or movie), a scheduled commercial is played automatically. The scheduled commercial is automatically stopped when the subscribing client provides an action (e.g., press a button in a remote control unit). In another exemplary embodiment, the STB 300 can automatically insert commercials while a video is being played. The service provider (e.g., a cable company) can set up a pricing policy that dictates how frequently commercials should interrupt the video being played.

In an exemplary embodiment, a cable company using the DOD system 100 can preset a price list based on the number of commercial interruptions. In one embodiment, data blocks for commercials are continuously broadcasted via a dedicated channel which also broadcasts a program guide, an emergency bit, and any firmware update. A user can choose from such a price list an acceptable balance between price and commercials. In an exemplary embodiment, the DOD system 100 implements the user's selection by maintaining an internal clock which allows automatic insertion of commercial data blocks at the predetermined time intervals based on the user's selected pricing scheme.

If an emergency information bit is found in a data packet header, the STB 300 pauses any data receiving operation and controls its hardware to tune into the channel reserved for receiving data file information to obtain and decode any emergency information to be displayed on an output screen. In an exemplary embodiment, when the STB 300 is idled, it is tuned to the channel reserved for receiving data file information and is always ready to receive and display any emergency information without delay.

In one embodiment, when the STB 300 appears to be idle (e.g., when a user is not using the system), an alarm may go off to alert a user to turn on the output device to view the emergency information. In another embodiment, the STB 300 is capable of distinguishing emergency information for different regions. For example, the emergency information for an unrelated region will not interrupt a data file being played or trigger an alarm. In contrast, in existing systems, cable companies have to manually interrupt a broadcast to send emergency information.

The foregoing examples illustrate certain exemplary embodiments of the invention from which other embodiments, variations, and modifications will be apparent to those skilled in the art. The invention should therefore not be limited to the particular embodiments discussed above, but rather is defined by the following claims.

Appendix A

Systems and Methods for Providing Video-On-Demand Services for Broadcasting Systems The following is a step-by-step description of the exemplary process illustrated in FIG. 4 for generating a scheduling matrix for a data file having six data blocks:
START
(Step 402) Receive a number of data blocks for a data file (x); assume the number of data blocks is equal to 6 (x=6).
(Step 404) Set j=0
(Step 406) Clear a Reference Array (RA)
(Step 408) Compare j to x.
(Step 412) j is less than x (0<6), let i=0
(Step 414) Compare i to x.
(Step 418) i is less than x (0<6). Read matrix positions of column [0] in the SM and write to RA; initially, the SM is empty so nothing is written into RA.
(Step 420) Does RA contain data block i or blk0?
(Step 422) RA does not contain anything because it is empty. Write blk0 into position [0, 0] in SM and the RA.
(Step 424) Add 1 to i (i=1) to derive value for position [1, 0]. Go back to Step 414.
(Step 414) Compare i to x.
(Step 418) i is less than x (1<6). Read matrix positions of column [1] in the SM and write to RA; initially, the SM is empty so nothing is written into RA.

(Step 420) Does RA contain data block i or blk1?
(Step 422) RA does not contain blk1. Write blk1 into position [1, 0] in SM and the RA.
(Step 424) Add 1 to i (i=2) to derive value for position [2, 0]. Go back to Step 414.
(Step 414) Compare i to x.
(Step 418) i is less than x (2<6). Read matrix positions of column [2] in the SM and write to RA; initially, the SM is empty so nothing is written into RA.
(Step 420) Does RA contain data block i or blk2?
(Step 422) RA does not contain blk2. Write blk2 into position [2, 0] in SM and the RA.
(Step 424) Add 1 to i (i=3) to derive value for position [3, 0]. Go back to Step 414.
(Step 414) Compare i to x.
(Step 418) i is less than x (3<6). Read matrix positions of column [3] in the SM and write to RA; initially, the SM is empty so nothing is written into RA.
(Step 420) Does RA contain data block i or blk3?
(Step 422) RA does not contain blk3. Write blk3 into position [3, 0] in SM and the RA.
(Step 424) Add 1 to i (i=4) to derive value for position [4, 0]. Go back to Step 414.
(Step 414) Compare i to x.
(Step 418) i is less than x (4<6). Read matrix positions of column [4] in the SM and write to RA; initially, the SM is empty so nothing is written into RA.
(Step 420) Does RA contain data block i or blk4?
(Step 422) RA does not contain blk4. Write blk4 into position [4, 0] in SM and the RA.
(Step 424) Add 1 to i (i=5) to derive value for position [5, 0]. Go back to Step 414.
(Step 414) Compare i to x.
(Step 418) i is less than x (5<6). Read matrix positions of column [5] in the SM and write to RA; initially, the SM is empty so nothing is written into RA.
(Step 420) Does RA contain data block i or blk5?
(Step 422) RA does not contain blk5. Write blk5 into position [5, 0] in SM and the RA.
(Step 424) Add 1 to i (i=6). Go back to Step 414.
(Step 414) Compare i to x.
(Step 416) i is equal to x (6=6). Increment j by 1 (j=1). Go to Step 406.
(Step 406) Clear a Reference Array (RA)
(Step 408) Compare j to x.
(Step 412) j is less than x (1<6), let i=0.
(Step 414) Compare i to x.
(Step 418) i is less than x (0<6). Read matrix positions of column [1] in the SM and write to RA.
Position [1, 0] contains blk1; thus, blk1 is written into RA. All other positions are empty.
(Step 420) Does RA contain data block i or blk0?
(Step 422) RA does not contain blk0. Write blk0 into position [1, 1] in the SM and the RA. RA now has blk1 and blk0.
(Step 424) Add 1 to i (i=1) to derive value for position (2, 1]. Go back to Step 414.
(Step 414) Compare i to x.
(Step 418) i is less than x (1<6). Read matrix positions of column [2] in the SM and write to RA.
Position [2, 0] contains blk2. All other positions are empty. RA now has blk1, blk0, and blk2.
(Step 420) Does RA contain data block i or blk1?
(Step 424) RA contains blk1. Thus, nothing is written into position [2, 1]. Add 1 to i (i=2) to derive value for position [3, 1]. Go back to Step 414.
(Step 414) Compare i to x.
(Step 418) i is less than x (2<6). Read matrix positions of column [3] in the SM and write to RA.
Position [3, 0] contains blk3. All other positions are empty. RA now has blk1, blk0, blk2, and blk3.
(Step 420) Does RA contain data block i or blk2?
(Step 424) RA does contain blk2. Thus, nothing is written into position [3, 1]. Add 1 to i (i=3) to derive value for position [4, 1]. Go back to Step 414.
(Step 414) Compare i to x.
(Step 418) i is less than x (3<6). Read matrix positions of column [4] in the SM and write to RA.
Position [4, 0] contains blk4. All other positions are empty. RA now has blk1, blk0, blk2, blk3, and blk4.
(Step 420) Does RA contain data block i or blk3?
(Step 424) RA does contain blk3. Thus, nothing is written into position [4, 1]. Add 1 to i (i=4) to derive value for position [5, 1]. Go back to Step 414.
(Step 414) Compare i to x.
(Step 418) i is less than x (4<6). Read matrix positions of column [5] in the SM and write to RA.
Position [5, 0] contains blk5. All other positions are empty. RA now has blk1, blk0, blk2, blk3, blk4, and blk5.
(Step 420) Does RA contain data block i or blk4?
(Step 424) RA does contain blk4. Thus, nothing is written into position [5, 1]. Add 1 to i (i=5) to derive value for position [0, 1]. Go back to Step 414.
(Step 414) Compare i to x.
(Step 418) i is less than x (5<6). Read matrix positions of column [0] in the SM and write to RA.
Position [0, 0] contains blk0. All other positions are empty. RA already contains blk0; thus, blk0 is discarded.
(Step 420) Does RA contain data block i or blk5?
(Step 424) RA does contain blk5. Thus, nothing is written into position [0, 1]. Add 1 to i (i=6).
Go back to Step 414.
(Step 414) Compare i to x.
(Step 416) i is equal to x (6=6). Increment j by 1 (=2). Go to Step 406.
(Step 406) Clear a Reference Array (RA)
(Step 408) Compare j to x.
(Step 412) j is less than x (2<6), let i=0.
(Step 414) Compare i to x.
(Step 418) i is less than x (0<6). Read matrix positions of column [2] in the SM and write to RA.
Position [2, 0] contains blk2. All other positions are empty. RA now has blk2.
(Step 420) Does RA contain data block i or blk0?
(Step 422) RA does not contain blk0. Write blk0 into position [2, 2] in the SM and the RA. RA now has blk2 and blk0.
(Step 424) Add 1 to i (i=1) to derive value for position [3, 2]. Go back to Step 414.
(Step 414) Compare i to x.
(Step 418) i is less than x (1<6). Read matrix positions of column [3] in the SM and write to RA.
Position [3, 0] contains blk3. All other positions are empty. RA now has blk2, blk0, and blk3.
(Step 420) Does RA contain data block i or blk1?
(Step 422) RA does not contain blk1. Write blk1 into position [3, 2] in the SM and the RA. RA now has blk2, blk0, blk3, and blk1.
(Step 424) Add 1 to i (i=2) to derive value for position [4, 2]. Go back to Step 414.
(Step 414) Compare i to x.
(Step 418) i is less than x (2<6). Read matrix positions of column [4] in the SM and write to RA.
Position [4, 0] contains blk4. All other positions are empty. RA now has blk2, blk0, blk3, blk1, and blk4.

(Step 420) Does RA contain data block i or blk2?
(Step 424) RA does contain blk2. Thus, nothing is written into position [4, 2]. Add 1 to i (i=3) to derive value for position [5, 2]. Go back to Step 414.
(Step 414) Compare i to x.
(Step 418) i is less than x (3<6). Read matrix positions of column [5] in the SM and write to RA.
Position [5, 0] contains blk5. All other positions are empty. RA now has blk2, blk0, blk3, blk1, blk4, and blk5.
(Step 420) Does RA contain data block i or blk3?
(Step 424) RA does contain blk3. Thus, nothing is written into position [5, 2]. Add 1 to i (i=4) to derive value for position [0, 2]. Go back to Step 414.
(Step 414) Compare i to x.
(Step 418) i is less than x (4<6). Read matrix positions of column [0] in the SM and write to RA.
Position [0, 0] contains blk0. All other positions are empty. RA already contain blk0; thus blk0 is discarded.
(Step 420) Does RA contain data block i or blk4?
(Step 424) RA does contain blk4. Thus, nothing is written into position [0, 2]. Add 1 to i (i=5) to derive value for position [1, 2]. Go back to Step 414.
(Step 414) Compare i to x.
(Step 418) i is less than x (5<6). Read matrix positions of column [1] in the SM and write to RA.
Position [1, 0] contains blk1 and position [1, 1] contains blk0. RA already contains blk1 and blk0; thus blk1 and blk0 are discarded. All other positions are empty.
(Step 420) Does RA contain data block i or blk5?
(Step 424) RA does contain blk5. Thus, nothing is written into position [1, 2]. Add 1 to i (i=6).
Go back to Step 414.
(Step 414) Compare i to x.
(Step 416) i is equal to x (6=6). Increment j by 1 (j=3). Go to Step 406.
(Step 406) Clear a Reference Array (RA)
(Step 408) Compare j to x.
(Step 412) j is less than x (3<6), let i=0.
(Step 414) Compare i to x.
(Step 418) i is less than x (0<6). Read matrix positions of column [3] in the SM and write to RA.
Position [3, 0] contains blk3 and position [3, 2] contains blk1. Blk3 and blk1 are written into RA. All other positions are empty.
(Step 420) Does RA contain data block i or blk0?
(Step 422) RA does not contain blk0. Write blk0 into position [3, 3] in the SM and the RA. RA now has blk3, blk1 and blk0.
(Step 424) Add 1 to i (i=1) to derive value for position (4, 3]. Go back to Step 414.
(Step 414) Compare i to x. (Step 418) i is less than x (1<6). Read matrix positions of column [4] in the SM and write to RA.
Position [4, 0] contains blk4. All other positions are empty. RA now has blk3, blk1, blk0 and blk4.
(Step 420) Does RA contain data block i or blk1?
(Step 424) RA does contain blk1. Thus, nothing is written into position [4, 3]. Add 1 to i (i=2) to derive value for position (5, 3]. Go back to Step 414.
(Step 414) Compare i to x.
(Step 418) i is less than x (2<6). Read matrix positions of column [5] in the SM and write to RA.
Position [5, 0] contains blk5. All other positions are empty. RA now has blk3, blk1, blk0, blk4, and blk5.
(Step 420) Does RA contain data block i or blk2?
(Step 422) RA does not contain blk2. Write blk2 into position [5, 3] in the SM and the RA. RA now has blk3, blk1, blk0, blk4, blk5, and blk2.
(Step 424) Add 1 to i (i=3) to derive value for position (0, 3]. Go back to Step 414.
(Step 414) Compare i to x.
(Step 418) i is less than x (3<6). Read matrix positions of column [0] in the SM and write to RA.
Position [0, 0] contains blk0. All other positions are empty. RA already contains blk0; thus, discard blk0.
(Step 420) Does RA contain data block i or blk3?
(Step 424) RA does contain blk3. Thus, nothing is written into position [0, 3]. Add 1 to i (i=4) to derive value for position (1, 3]. Go back to Step 414.
(Step 414) Compare i to x.
(Step 418) i is less than x (4<6). Read matrix positions of column [1] in the SM and write to RA.
Position [1, 0] contains blk1 and position [1, 1] contains blk0. All other positions are empty.
RA already contains blk1 and blk0; do not write a duplicate copy.
(Step 420) Does RA contain data block i or blk4?
(Step 424) RA does contain blk4. Thus, nothing is written into position [1, 3]. Add 1 to i (i=5) to derive value for position [2, 3]. Go back to Step 414.
(Step 414) Compare i to x.
(Step 418) i is less than x (5<6). Read matrix positions of column [2] in the SM and write to RA.
Position [2, 0] contains blk2 and position [2, 2] contains blk0. All other positions are empty.
RA already contains blk2 and blk0; do not write a duplicate copy.
(Step 420) Does RA contain data block i or blk5?
(Step 424) RA does contain blk5. Thus, nothing is written into position [2, 3]. Add 1 to i (i=6).
Go back to Step 414.
(Step 414) Compare i to x.
(Step 416) i is equal to x (6=6). Increment j by 1 (=4). Go to Step 406.
(Step 406) Clear a Reference Array (RA)
(Step 408) Compare j to x.
(Step 412) j is less than x (4<6), let i=0.
(Step 414) Compare i to x.
(Step 418) i is less than x (0<6). Read matrix positions of column [4] in the SM and write to RA.
Position [4, 0] contains blk4. Blk4 is written into RA. All other positions are empty.
(Step 420) Does RA contain data block i or blk0?
(Step 422) RA does not contain blk0. Write blk0 into position [4, 4] in the SM and the RA. RA now has blk4 and blk0.
(Step 424) Add 1 to i (i=1) to derive value for position [5, 4]. Go back to Step 414.
(Step 414) Compare i to x.
(Step 418) i is less than x (1<6). Read matrix positions of column [5] in the SM and write to RA.
Position [5, 0] contains blk5 and position [5, 3] contains blk2. All other positions are empty.
RA now has blk4, blk0, blk5, and blk2.
(Step 420) Does RA contain data block i or blk1?
(Step 422) RA does not contain blk1. Write blk1 into position [5, 4] of the SM and the RA. RA now has blk4, blk0, blk5, blk2, and blk1.
(Step 424) Add 1 to i (i=2) to derive value for position [0, 4]. Go back to Step 414.
(Step 414) Compare i to x.
(Step 418) i is less than x (2<6). Read matrix positions of column [0] in the SM and write to RA.
Position [0, 0] contains blk0. All other positions are empty. RA already contains blk0; thus, do not write a duplicate copy.

(Step 420) Does RA contain data block i or blk2?
(Step 424) RA does contain blk2. Add 1 to i (i=3) to derive value for position [1,4]. Go back to Step 414.
(Step 414) Compare i to x.
(Step 418) i is less than x (3<6). Read matrix positions of column [1] in the SM and write to RA.
Position [1, 0] contains blk1 and position [1, 1]. All other positions are empty. RA already contains blk1 and blk0; do not write a duplicate copy.
(Step 420) Does RA contain data block i or blk3?
(Step 422) RA does not contain blk3. Write blk3 into position [1, 4] of the SM and the RA. RA now has blk4, blk0, blk5, blk2, blk1, and blk3.
(Step 424) Add 1 to i (i=4) to derive value for position [2, 4]. Go back to Step 414.
(Step 414) Compare i to x.
(Step 418) i is less than x (4<6). Read matrix positions of column [2] in the SM and write to RA.
Position [2, 0] contains blk2 and position [2, 2] contains blk0. All other positions are empty.
RA already contains blk2 and blk0; do not write a duplicate copy.
(Step 420) Does RA contain data block i or blk4?
(Step 424) RA does contain blk4. Thus, nothing is written into position [2, 4]. Add 1 to i (i=5) to derive value for position [3, 4]. Go back to Step 414.
(Step 414) Compare i to x.
(Step 418) i is less than x (5<6). Read matrix positions of column [3] in the SM and write to RA.
Position [3, 0] contains blk3, position [3, 2] contains blk1, and position [3, 3] contains blk0. All other positions are empty. RA already contains blk3, blk1, and blk0; do not write a duplicate copy.
(Step 420) Does RA contain data block i or blk5?
(Step 424) RA does contain blk5. Thus, nothing is written into position [3, 4]. Add 1 to i (i=6).
Go back to Step 414.
(Step 414) Compare i to x.
(Step 416) i is equal to x (6=6). Increment j by 1 (j=5). Go to Step 406.

(Step 406) Clear a Reference Array (RA)
(Step 408) Compare j to x.
(Step 412) j is less than x (5<6), let i=0.
(Step 414) Compare i to x.
(Step 418) i is less than x (0<6). Read matrix positions of column [5] in the SM and write to RA.
Position [5, 0] contains blk5, position [5, 3] contains blk2, and position [5, 4] contains blk1.
Blk5, blk2, and blk1 are written into RA. All other positions are empty.
(Step 420) DoesRA contain data block i or blk0?
(Step 422) RA does not contain blk0. Write blk0 into position [5, 5] in the SM and the RA. RA now has blk5, blk2, blk1, and blk0.
(Step 424) Add 1 to i (i=1) to derive value for position [0, 5]. Go back to Step 414.
(Step 414) Compare i to x.
(Step 418) i is less than x (1<6). Read matrix positions of column [0] in the SM and write to RA.
Position [0,0 ] contains blk0 and all other positions are empty. RA now has blk5, blk2, blk1, and blk0
(Step 420) Does RA contain data block i or blk1?
(Step 424) RA does contain blk1. Add 1 to i (i=2) to derive value for position (1, 5]. Go back to Step 414.
(Step 414) Compare i to x.
(Step 418) i is less than x (2<6). Read matrix positions of column [1] in the SM and write to RA.
Position [1, 0] contains blk1, position [1, 1] contains blk0, and position [1, 4] contains blk3. All other positions are empty. RA already contains blk0 and blk1; thus, do not write a duplicate copy. Write blk3 into RA. RA now has blk5, blk2, blk1, blk0, and blk3.
(Step 420) Does RA contain data block i or blk2?
(Step 424) RA does contain blk2. Add 1 to i (i=3) to derive value for position (2, 5]. Go back to Step 414.
(Step 414) Compare i to x.
(Step 418) i is less than x (3<6). Read matrix positions of column [2] in the SM and write to RA.
Position [2, 0] contains blk2 and position [2, 2] contains blk0. All other positions are empty. RA already contains blk2 and blk0; do not write a duplicate copy.
(Step 420) Does RA contain data block i or blk3?
(Step 424) RA does contain blk3. Add 1 to i (i=4) to derive value for position (3, 5]. Go back to Step 414.
(Step 414) Compare i to x.
(Step 418) i is less than x (4<6). Read matrix positions of column [3] in the SM and write to RA.
Position [3, 0] contains blk3, position [3, 2] contains blk1, position [3, 3] contains blk0. All other positions are empty. RA already contains blk3, blk1, and blk0; do not write a duplicate copy.
(Step 420) Does RA contain data block i or blk4?
(Step 422) RA does not contain blk4. Write blk4 into position [3, 5] of the SM and the RA. The RA now has blk5, blk2, blk1, blk0, blk3, and blk4.
(Step 424) Add 1 to i (i=5) to derive value for position [4, 5]. Go back to Step 414.
(Step 414) Compare i to x.
(Step 418) i is less than x (5<6). Read matrix positions of column [4] in the SM and write to RA.
Position [4, 0] contains blk4 and position [4, 4] contains blk0. All other positions are empty.
RA already contains blk4 and blk0; do not write a duplicate copy.
(Step 420) Does RA contain data block i or blk5?
(Step 424) RA does contain blk5. Thus, nothing is written into position [3, 4].
(Step 424) Add 1 to i (i=6). Go back to Step 414.
(Step 414) Compare i to x.
(Step 416) i is equal to x (6=6). Increment j by 1 (0=5). Go to Step 406.

(Step 406) Clear a Reference Array (RA)
(Step 408) Compare j to x.
(Step 410) j is equal to x (6<6); END.

What is claimed is:

1. A method for sending data to a client to provide data-on-demand services, the method comprising the steps of:

(a) receiving a data file;
   (b) specifying a time interval;
   (c) parsing said data file into a plurality of data blocks based on said time interval;
   (d) prefetching a set of prefetched data blocks from said plurality of data blocks, wherein prefetching said set of prefetched data blocks includes the acts of:
   determining a desired reduction in bandwidth that is necessary for transmitting a remaining data blocks of said plurality of data blocks to said client;
   determining a desired prefetch delay time that is associated with receiving said set of prefetched data blocks at said client; and
   selecting said set of prefetch data blocks based on said desired reduction in bandwidth and said desired prefetch delay time;

(e) sending said set of prefetched data blocks in a dedicated channel; and (f) transmitting said remaining data blocks of said plurality of data blocks in a transmission channel.

2. An apparatus for scheduling and broadcasting on demand data, the apparatus comprising:

a first channel server suitable for the transmission of digital broadcast data via a first channel;

a second channel server suitable for the transmission of digital broadcast data via a second channel;

a data broadcast controller for:
  parsing an on-demand data file into a plurality of blocks of data;
  preparing a scheduling matrix comprising said plurality of blocks of data; and
  prefetching a set number of blocks of data from said scheduling matrix to form a set number of prefetched blocks of data;
  determining a prefetch delay time that is associated with receiving said set number of prefetched blocks of data;
  wherein said data broadcast controller reduces a bandwidth necessary for transmission of a remaining blocks of data from said plurality of blocks of data by prefetching said set number of blocks of data; and a transmitter for transmitting said set number of prefetched blocks of data on said first channel, and transmitting said remaining blocks of data as scheduled in said matrix on said second channel.

3. The apparatus for scheduling and broadcasting on demand data as in claim 2, wherein the data broadcast controller determines an optimal set number of blocks of data to prefetch based on a determined reduction in bandwidth that is necessary for transmitting said remaining blocks of data of said plurality of blocks of data and said determined prefetch delay time that is associated with receiving said optimal set number of blocks of data to prefetch.

4. The apparatus for scheduling and broadcasting on demand data as in claim 3, wherein the data broadcast controller determines the optimal set number of blocks of data to prefetch on an incremental block by block basis.

5. The apparatus for scheduling and broadcasting on demand data as in claim 2, wherein the data broadcast controller prepares a scheduling matrix comprised of blocks of data for a plurality of different on-demand data files.

6. The apparatus for scheduling and broadcasting on demand data as in claim 5, wherein the transmitter transmits a plurality of different on-demand data files on said second channel.

7. The apparatus for scheduling and broadcasting on demand data as in claim 6, wherein the transmitter transmits prefetched data from a plurality of different on-demand data files on said first channel.

8. The apparatus for scheduling and broadcasting on demand data as in claim 2, wherein preview data is transmitted on said first channel.

9. The apparatus for scheduling and broadcasting on demand data as in claim 2, wherein emergency data is transmitted on said first channel.

10. The apparatus for scheduling and broadcasting on demand data as in claim 2, wherein commercial data is transmitted on said first channel.

11. The apparatus for scheduling and broadcasting on demand data as in claim 2, wherein the data broadcast controller randomly selects blocks of data for as preview data to be transmitted on said first channel.

12. An apparatus capable of receiving and handling a plurality of digital data services such as VOD and digital broadcast, said apparatus comprising:

a databus;

a first communication device suitable for coupling to a digital broadcast communications medium, said first communication device operable to receive digital broadcast data over at least a first and second channels;

memory bi-directionally coupled to said databus;

a digital data decoder bi-directionally coupled to said databus; and a central processing unit (CPU) bi-directionally coupled to said databus, said CPU implementing a control process controlling said memory, said digital decoder, and a demodulator, said control process executing instructions for combining the received digital broadcast data from said first and second channels to reproduce an on-demand digital data file; wherein the received digital broadcast data on said first channel includes prefetched data blocks from said on-demand digital data file and the received digital broadcast data on said second channel includes data blocks from said on-demand digital data file in accordance with a scheduling matrix, and wherein said prefetched data blocks are prefetched based on a determined reduction of bandwidth that is necessary for transmitting the received digital broadcast data on said second channel and a determined prefetch delay time that is associated with transmitting said prefetched data blocks on said first channel.

13. The apparatus for scheduling and broadcasting on demand data as in claim 2, wherein the on-demand digital data file is a video on demand data file.

14. The apparatus for scheduling and broadcasting on demand data as in claim 8, wherein the on-demand data file is a web page data file.

* * * * *